United States Patent [19]

Kumada

[11] Patent Number: 4,947,076
[45] Date of Patent: Aug. 7, 1990

[54] PIEZO ELECTRIC MOTOR
[75] Inventor: Akio Kumada, Tokyo, Japan
[73] Assignee: Hitachi Maxell, Ltd., Osaka, Japan
[21] Appl. No.: 285,394
[22] Filed: Dec. 16, 1988

Related U.S. Application Data

[63] Continuation of Ser. No. 168,575, Mar. 7, 1988, abandoned, which is a continuation of Ser. No. 910,264, Sep. 19, 1986, abandoned, which is a continuation of Ser. No. 650,458, Sep. 14, 1984, abandoned.

[30] Foreign Application Priority Data

Sep. 16, 1983 [JP] Japan ................... 58-169364
Sep. 16, 1983 [JP] Japan ................... 58-169366

[51] Int. Cl.$^5$ ............................................ H01L 41/08
[52] U.S. Cl. ...................................................... 310/323
[58] Field of Search ................ 310/321, 323, 325, 328

[56]  References Cited

U.S. PATENT DOCUMENTS

| 3,211,931 | 10/1965 | Tehon ...................................... 310/333 |
| 4,210,837 | 7/1980 | Vasiliev et al. ....................... 310/323 |
| 4,325,264 | 4/1982 | Sashida ................................. 310/323 X |
| 4,484,099 | 11/1984 | Kawai et al. ...................... 310/323 X |

FOREIGN PATENT DOCUMENTS

| 0532947 | 2/1977 | U.S.S.R. ................................ 310/323 |
| 0576648 | 10/1977 | U.S.S.R. ............................... 310/323 |
| 0604058 | 4/1978 | U.S.S.R. ............................... 310/328 |
| 0623241 | 9/1978 | U.S.S.R. ............................... 310/323 |
| 2044015 | 9/1980 | United Kingdom ................ 310/323 |

Primary Examiner—Mark O. Budd

[57] ABSTRACT

A piezoelectric motor comprising a movable element having a first flat surface, vibration elements formed by combination of at least one twisting vibration member vibrating in a twisting manner and at least one piezoelectric element acting to vibrate the twisting vibration member. The vibration elements have a second flat surface adapted to abut against the first flat surface so that the movable element can be driven by surface contact between the first flat surface and the second flat surface.

7 Claims, 6 Drawing Sheets

PIEZO ELECTRIC MOTOR

This application is a continuation of application Ser. No. 168,575 filed on Mar. 7, 1988, now abandoned which was a continuation of application Ser. No. 910,264 filed on Sep. 19, 1986 now abandoned and which is a continuation of application Ser. No. 650,458 filed on Sep. 14, 1984 now abandoned.

FIELD OF THE INVENTION

The present invention relates to a piezo electric motor, and more particularly to a piezo electric motor using vibration elements such as ultrasonic resonators operated in a spiral vibration mode as a driving source.

BACKGROUND OF THE INVENTION

Figure 1:
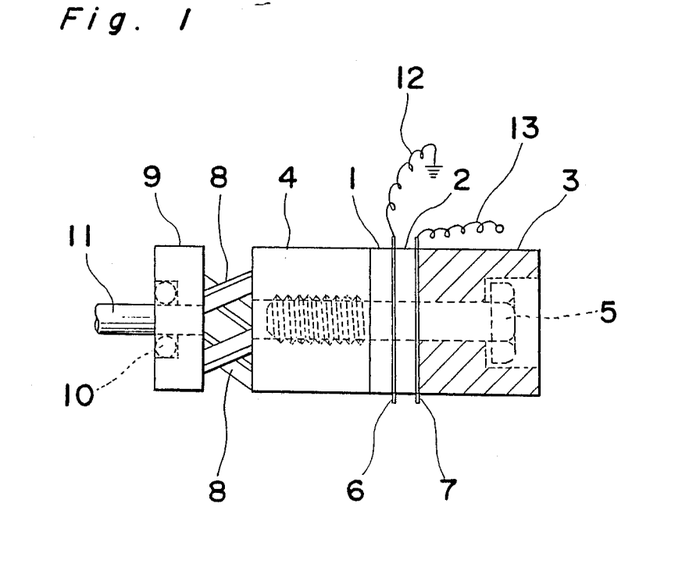
FIG. 1 is a side view showing an example of a conventional piezoelectric motor of a woodpecker type.

A piezo electric motor has been known as a so called woodpecker type motor. FIG. 1 shows an essential portion of the woodpecker type motor, wherein four Langevin resonators 1, 2, 3 and 4 of a cylindrical configuration are securedly connected by a bolt 5. Both end faces of the resonators 3 and 4 are vibrated in the axial direction by the application of a high frequency voltage to electrode plates 6 and 7 through terminals 12 and 13. A plurality of bars 8 are slantingly and projectedly secured on the end surface of the rotor 9 which is rotatably supported by a bearing 10. Each free end of the bars 8 is closely opposed to the end surface of the element 4 so that upon vibration of the resonator 4 with the free ends of the bars 8 depressed to the end surface of the resonator 4, the bars 8 are bent in an arcuate configuration, thereby producing a rotational torque on the rotor 9 for rotation of a shaft 11. As the woodpecker type motor rotates pecking the end surface of the resonator 4 by the bars 8, the end surface of the resonator 4 is easily damaged and the bars 8 and the end surface of the resonator 4 are rapidly worn away.

SUMMARY OF THE INVENTION

An essential object of the present invention is to provide a piezoelectric motor in which the surfaces of the vibration elements are not easily worn away.

According to the present invention, there is provided a piezoelectric motor comprising a movable means having a first flat surface, vibration means formed by a combination of at least one twisting vibration member which vibrates in a twisting mode and at least one piezoelectric element acting to vibrate said twisting vibration member, said vibration means having a second flat surface adapted to abut against the first flat surface so that the movable means can be driven by contacting the surface between the first flat surface and the second flat surface.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF EXPLANATION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 2:
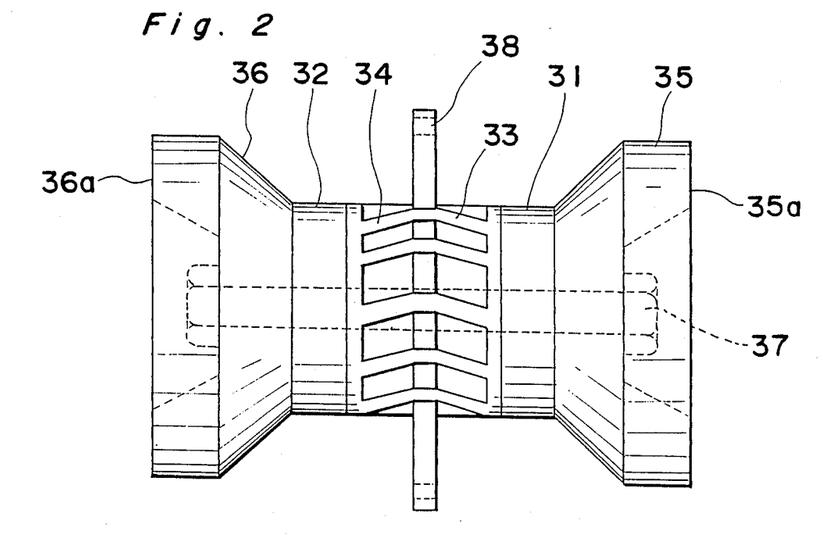
FIG. 2 is a side view of a spiral mode resonator arrangement according to the present invention.
Figure 3:
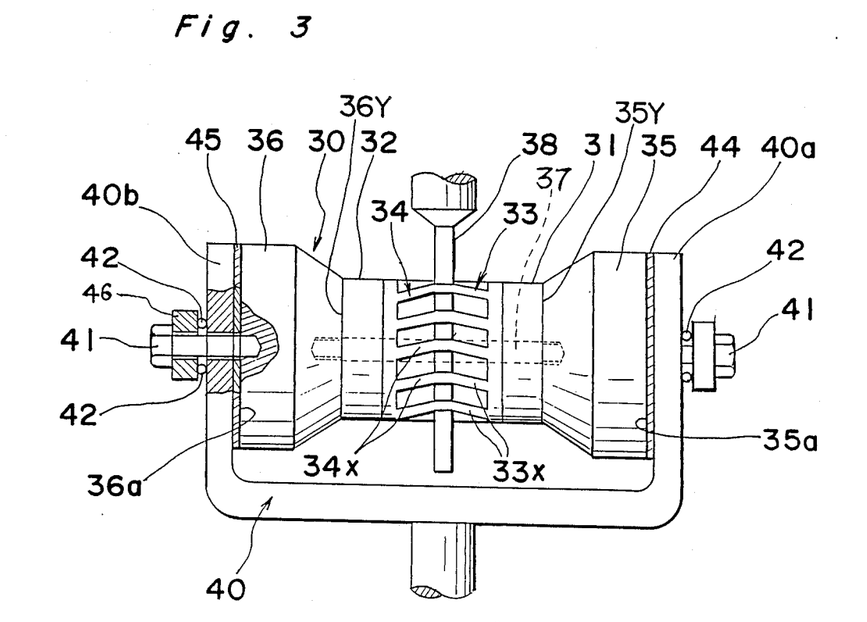
FIG. 3 is a side view showing a first embodiment of a piezoelectric motor according to the present invention.

Referring to FIGS. 2 and 3, an ultrasonic spiral mode resonator 30, the details of which will be described hereinafter and a rotating member 40 in a fork shape having a pair of arms 40a and 40b are connected by a connecting bolt 41.

Figure 4:
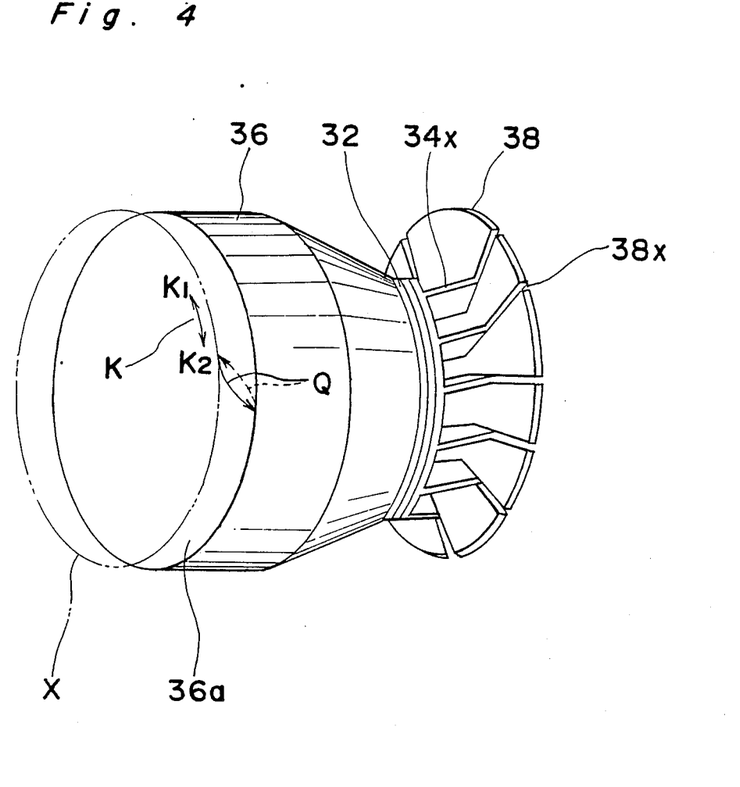
FIG. 4 is a perspective view showing a part of the spiral resonator arrangement shown in FIG. 2.

The spiral mode resonator 30 comprises a support plate 38 which is fixed to a stationary frame (not shown) and a pair of twisting couplers 33 and 34 having a plurality of vanes 33x and 34x each extending towards the supporting plate 38 at a slanted angle. The twisting couplers 33 and 34 are disposed on both sides of the support plate 38. The ends of the slanted vanes 33x and 34x are securedly connected to the support plate 38. Each of the left side vanes 33x and the right side vanes 34x may be formed from one continuous plate, having the intermediate portion of the vane fitted in the radial slot 38x defined in the support plate 38. A pair of piezoelectric elements 31 and 32 or vibration elements are assembled on both outsides of the twisting couplers 33 and 34. The piezoelectric elements 31 and 32 are made of ceramic material of $Pb(Zr-Ti).O_3$ system, each having a cylindrical shape and polarized in the axial direction. A pair of resonator elements 35 and 36 made of hard aluminum are assembled on the outside of both of the piezoelectric elements 31 and 32. These vibration elements 31, 32, 33, 34, 35 and 36 are fastened by a combination of a bolt and nut 37. The twisting couplers 33 and 34 are integrally formed. By fastening these elements by the bolt and nut 37, these elements 31, 32, 33, 34, 35 and 36 are slightly twisted and the total length is decreased due to a buckling deformation occurred in the vanes 33x and 34x. By the application of a high frequency voltage to the piezoelectric elements 31 and 32, they vibrate in an expansion and compression manner with an ultrasonic frequency, whereby the elements 33, 34, 35 and 36 are vibrated in a resonance frequency having an ultrasonic frequency, so that the resonator elements 35 and 36 are vibrated in the axial direction of the respective elements 31 to 36 with the twisting vibration against the supporting plate 38 due to the compression and expansion of the vanes 33x and 34x, whereby the spiral mode resonator 30 vibrates in the spiral mode. The manner of spiral mode vibration is illustrated in FIG. 4. Upon expansion of the piezoelectric elements 31 and 32, the end face of the resonator elements 36 is projected to a state as shown in the phantom line x and returns to the state shown in the real line and this movement is repeated. In addition, upon expansion of the piezoelectric elements 31 and 32, the vanes 33x and 34x are buckled, the resonance element 36 is twistingly vibrated, then the end surface of the element 36 also vibrated in the circumferential direction as shown in the arrow mark K. Therefore, the resultant motion of the two kinds of vibration is represented by the arrow marks Q. The resultant motion of the resonator element 36 is referred to as the spiral mode vibration hereinafter. It is noted that the nuts 37 shown in FIG. 2 are not necessary in the arrangement shown in FIG. 3, by defining screw holes on the inner portions 35y and 36y so as to engage with the both end portion of the bolt penetrated through the elements 31 through 34.

EXAMPLE 1

Turning to FIG. 3 again, the spiral mode resonator 30 is fitted in the space between the two arms 40a and 40b of the rotating member 40 with the end surfaces 35a and 36a of the resonator elements 35 and 36 made as flat planes and opposed to the flat sliding faces 44 of the arms 40a and 40b. Screws 41 are fastened to the resonator 35 and 36 and to interposing collars 46 and ball bearings 42 so that the arms 40a and 40b are pressed towards the end faces 35a and 36a, thereby to cause the sliding faces 44 to closely abut onto the end surfaces 35a and 36a with friction. By the application of a high frequency power source in the form of a saw tooth shape of 32 KHz of about 30 volts between the end faces 35a and 36a, the arm 40 is rotated around the axis of the spiral mode resonator 30 due to the spiral mode vibration of the resonator elements 35 and 36. In detail, assuming that when the resonator element 36 (or 35) is expanded as shown in the phantom lines in FIG. 4, the resonator element 36 is twisted in the direction k1, on the contrary when compressed, the resonator element 36 is twisted in the direction K2. Thus, upon projection of the resonator element 36 (or 35), the end face 36a is tightly engaged with the sliding face 45 of the arm 40b twisting in the direction K1, thereby causing the arm 40 to rotate in the direction K1. Upon compression of the resonator element 36, the engagement of the end face 36a and the sliding face 45 is released with the resonator element 36 twisted in the direction K2 without moving the arm 40. Upon repetition of the movement, the arm 40 can be rotated in the direction K1.

In this embodiment, the diameter of the elements and 32 is 30 mm, the diameter of the elements 35 and 36 is 50 mm and the length between the end surfaces 35a and 36a is 60 mm. An article of 1.5 kg hung on the lever 45 connected to the arm 40 was lifted upward by rotation of the arms 40. After the article was lifted up and the applied voltage was eliminated, the article remained at the lifted up position. By the application of D.C. power to the arms 40, the engagement of the end surface 36a and the sliding face 45 was released due to the compression of the resonator 36, then the arms 40 were loosened so that the article was slowly lowered. The arrangement mentioned above is an example of an application of the spiral mode piezo electric motor according to an arm of a robot.

EXAMPLE 2

Figure 5:
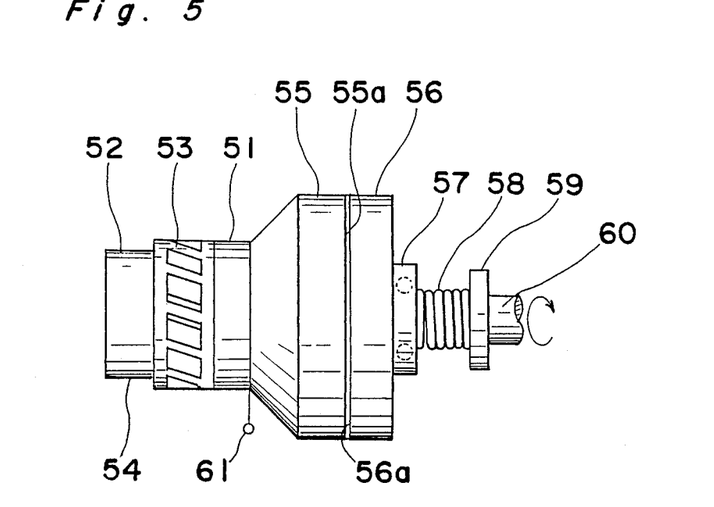
FIG. 5 is a side view of an essential portion of a second example of a piezoelectric motor according to the present invention.

The example 1 is an arrangement using two surfaces of the resonator elements 35 and 36 so as to obtain a great torque. The spiral mode vibration motor according to the present invention can be used for only one surface of the vibration element since the spiral mode resonator 30 has a symmetric configuration with respect to the support plate 38. Referring to FIG. 5, a piezo electric element 51 of 50 mm diameter, a twisting vibration coupling element 53 of 50 mm diameter, and a stator 52 are laid side by side and fastened together with a resonator element 55 of 80 mm diameter by a bolt (not shown). The stator 52 is secured to a stationary member (not shown) by a member inserted in a cut portion 54. A sliding surface 56a of a rotor 56 having a rotation shaft 60 is adapted to oppose the end surface 55a of the resonator element 55 and the rotation shaft 60 is rotatably supported by a bearing 57. A pressure adjusting nut 59 is screwed on the shaft 60 so as to adjust the length of a coil spring 58 by displacement of the nut 59 for pushing the ring 57 and the rotor 56. By rotation of a pressure adjusting member 59, for shifting the member 59 toward the rotor 56, the sliding surface 56a is pressed to the end surface 55a of the resonator element 55. By the application of a high frequency power of 25 KHz and about 30 volts to the stator 52 and the piezo electric element 51 through a lead wire 61, the rotor was rotated with a rotational speed of 300 r.p.m. The rotation torque was so great that the rotor was not able to be stopped by hand. As the sliding surface was large, a great rotation torque was obtained. The input electric power was 35 watts.

EXAMPLE 3

Figure 6:
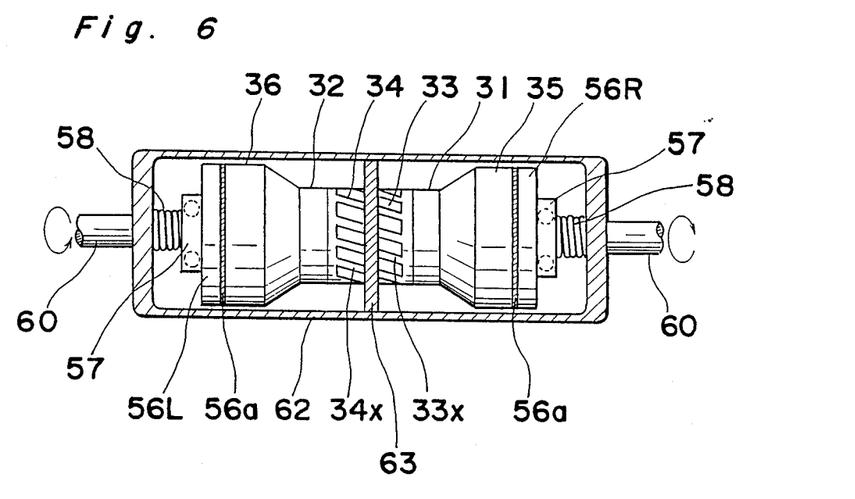
FIG. 6 is a side view showing the second embodiment of a piezoelectric motor according to the present invention.

Referring to FIG. 6, the spiral mode vibration motor as shown in FIG. 3 is enclosed in a cylindrical case 62 with the end surfaces of the resonator elements 35 and 36 pressed to respective sliding plates 37 having rotational shafts 60. It is noted that in the example 3, the direction of the slanting planes of the vanes 33x and 34x of the twisting couplers 33 and 34 are the same on both sides of the supporting plate 63, whereby the right half rotor 56R rotates in reversed direction of the rotation of the left half rotor 56 L. The supporting plate 63 is integrally connected with the cylindrical case 62. Thus, the spiral mode vibration motor in this example has an appearance that two rotational shafts 60 which rotate in a forward direction and a reversed direction are protruded from the cylindrical case 62. The contacting pressure of the sliding surface is important for defining the rotation torque, and therefore, the contacting pressure can be adjusted by a pressure adjusting member 59 as shown in the example in FIG. 5. The adjusting member 59 is assembled to the case 62 and the tension of the coil spring 58 is adjusted by rotation of the adjusting member 59.

EXAMPLE 4

Figure 7:
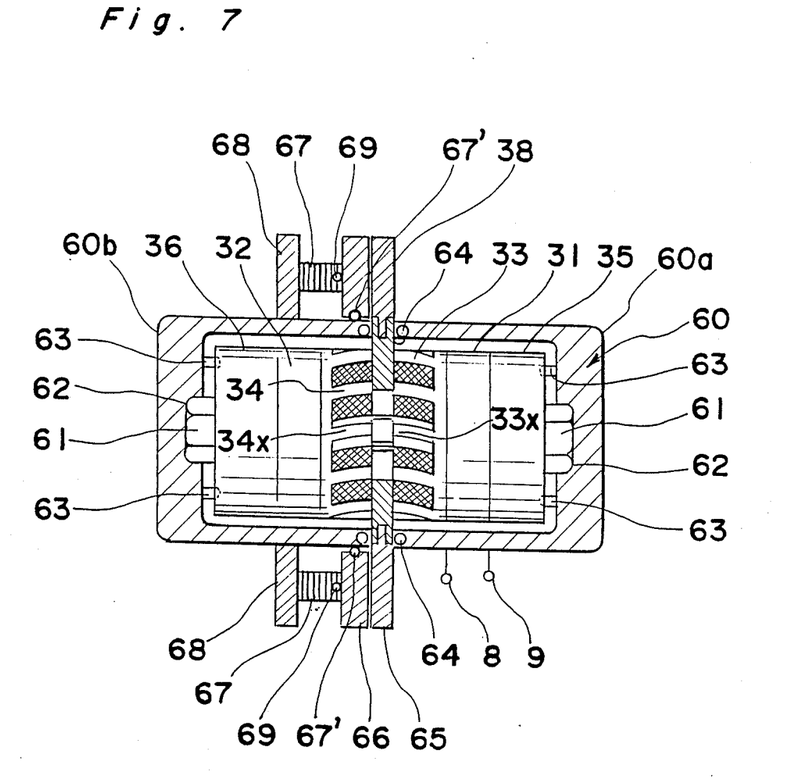
FIG. 7 is a cross sectional view showing a third embodiment of a piezoelectric motor according to the present invention.

Referring to FIG. 7, the spiral mode resonator 30 s accommodated in a cylindrical case 60 which is made of a right half case 60a and a left half case 60b. The spiral mode resonator 30 is secured in the case 60 and prevented from rotation by embedding the hexagonal nuts 61 in the recess 62 defined in the inner face of the each half case 60a and 60b, and by inserting rods 63 projected from each half case 60a and 60b into holes defined in the resonator elements 35 and 6. The twisting couplers 33 and 34 are formed by a plurality of vanes using buckling spring plates 33x and 34y the respective ends of which are securely connected with the supporting plate 38 so that the buckling spring plates 33x and 34x are buckled or bent arcuately upon expansion of the piezoelectric elements 31 and 32. The supporting plate 38 is rotatably clamped by the right half case 60a and left half case 60b through ball bearings 64. The piezoelectric elements 31 and 32, the twisting couplers 33 and 34 and the resonator elements 35 and 36 are integrally connected by a bolt (not shown) and fastened by nuts 61 at the both ends of the bolt. The supporting plate 38 is radially projected from the case 60 to form an annular ring portion 65 made of gun metal. A rotor 66 in the form of an annular plate is rotatably fitted around the case 60 through ball bearings 67' fitted in the inner peripheral wall of the rotor 66 so as to abut onto the one side face of the annular ring portion 65. Said rotor 66 is pressed toward the annular ring portion 65 through ball bearings 69 installed in the end portion of respective piezo electric elements acting as pressing members 67 securedly supported on a stationary frame 68.

In this example, the diameter of the resonator elements 35 and 36 is 35 mm and the length between the end surfaces of the resonator elements 35 and 36 is 44 mm. The outer diameter of the annular ring portion 65 is 60 mm and the thickness thereof is 3 mm.

In the motor as described above, under the application of a high frequency electric power to the piezoelectric elements 31 and 32, the torsional vibration occurs on the supporting plate 38. Under such a state, upon application of the high frequency electric power in phase with the electric power applied to the piezoelectric elements 31 and 32, the rotor 66 rotates in one direction by repetition of tight engagement and disengagement of the rotor 66 onto the annular ring plate 65 due to expansion and compression of the pressing members 67. In one example, the rotor 66 was rotated at 500 r.p.m..

By the application of the high frequency electric power to the pressing members 67 with a reversed phase of the electric power applied to the piezoelectric elements 31 and 32, the rotor 66 was rotated in the reversed direction. The rotational speed and torque of the rotor 66 can be defined expansion force of the pressing members 67 and the phase of the electric power applied to the pressing members 67.

Although the pressing members 67 are formed by laminated piezoelectric elements, other types of vibration elements can be used so long as the elements can vibrate with an amplitude of more than 10 micron meters at 10 KHz.

EXAMPLE 5

Figure 8:
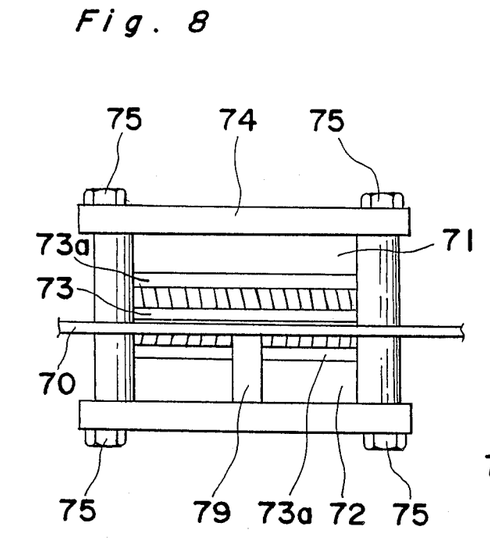
FIG. 8 is a front view showing a fourth embodiment of a piezoelectric motor according to the present invention.
Figure 9:
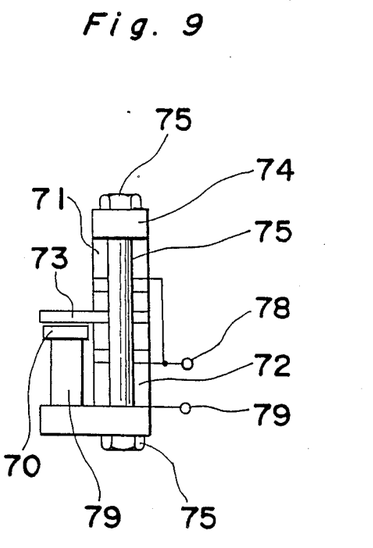
FIG. 9 is a side view of FIG. 8.

Referring to FIGS. 8 and 9, a movable element is a linear rail 70, which acts as a rotor. The rail 70 is movable linearly with respect to the stator of the motor body. Piezoelectric elements 71 and 72 each having 10 mm width x 40 mm length x 7 mm thickness are respectively laminated on the surfaces 73a having 10 mm width x 40 mm length of slip connecting member 73, clamped by vibration elements 74 of 10 mm width x 60 mm length x 7 mm thickness. The resonator elements 74 are tightly fastened by bolts of 6 mm diameter x 50 mm length and nuts 75 up to such a degree that the slip connecting element is resiliently bent by 0.1 mm. By the application of a high frequency electric power of 30 KHz and 20 volts to the piezoelectric vibration elements 71 and 72 through the terminals 77 and 78, the slip connecting members 73 vibrated with an amplitude of 30 micron meters. Under such a state, the rail 70 of 5 mm width and 2 mm thickness is put in the gap between the pressing element 79 and the slip connecting member 73 to which the electric power in phase with the electric power applied to the piezoelectric elements 71 and 72 is applied so that the rail 70 is moved in the longitudinal direction thereof with a speed of 40 cm/sec.

Upon reversing of the phase of electric power applied to the pressing element 79, the rail 70 is immediately moved in the reversed direction with the same speed of 40 cm/sec.

EXAMPLE 6

Figure 10:
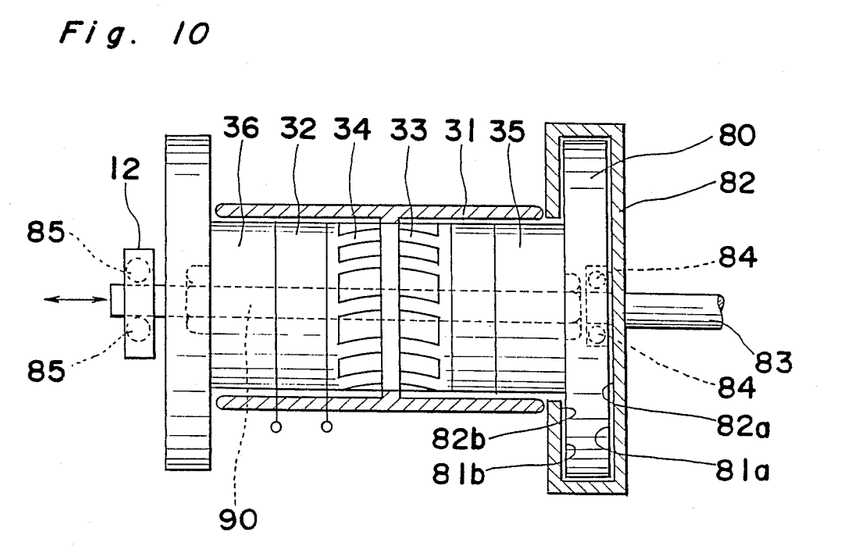
FIG. 10 is a cross sectional view showing a fifth embodiment of a piezoelectric motor according to the present invention.

Referring to FIG. 10, a spiral mode resonator element 35 is connected with a sliding cylinder 80 having an enlarged diameter. Said sliding cylinder 80 is enclosed in a space of a hollow cylindrical rotor 82 with the end surfaces 81a and 81b of the sliding cylinder 80 opposed to the inner surfaces 82a and 82b of the cylindrical rotor 82. The rotor 82 is supported by a shaft 83 which is rotatably supported by roller bearings 84 embeded in the sliding cylinder 80. The bolt 90 is passed through the elements 31 through 36 and the opposite side of the bolt 90 of the vibration elements is projected by 15 mm than the nut fastening part with a decreased diameter. The bolt 90 is rotatably supported by roller bearing 85. By applying a high frequency electric power of 20 KHz, 30 volts to the piezoelectric element 32, pushing the shaft 83 rightward from the part in which the roller bearing 85 is provided the rotor 82 is rotated in one direction. On the contrary, by pulling the shaft 83 leftward, the rotor 82 is rotated in the reversed direction.

In the various embodiments described above, in case where a sufficient vibration force and amplitude are obtained only by the piezoelectric elements, the resonator elements may be omitted.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A piezoelectric motor comprising movable means having a first flat surface, vibration means formed by the combination of at least one bendable, twisting vibration member and at least one piezoelectric element acting to longitudinally vibrate through expansion and compression, said twisting vibration member having a plurality of vanes slantingly extending toward a supporting member so that said twisting vibration member is vibrated in a bending and twisting manner with the same frequency as the frequency of the vibration of said piezoelectric element, said vibration means having a second flat surface which vibrates spirally as the resultant motion between the twisting vibration of the twisting vibration member and expansion-compression vibration of said piezoelectric element and which surface is adapted to abut with the first flat surface so that the movable means can be driven by the spiral mode vibration of the second flat surface due to face-to-face contact between the first flat surface and the second flat surface, said movable means being a rotor supported on a shaft on which a coil spring is mounted for adjusting the contacting force of the rotor with the vibration means.

2. The piezoelectric motor according to claim 1, wherein said vibration means comprises resonance means and the first flat surface of the movable means is abutted onto the resonance means.

3. The piezoelectric motor according to claim 2, wherein said resonance means comprises one surface opposing the first flat surface of the movable means and another surface opposing the second flat surface of the vibration means.

4. The piezoelectric motor according to claim 3, wherein said vibration means is formed by at least one twisting vibration member and at least one cylindrical piezo-electric element coaxially secured to the twisting vibration member by an element which penetrates the center of the twisting vibration member and the piezoelectric vibration element so as to produce a twisting vibration in the twisting vibration member.

5. A piezoelectric motor comprising
a pair of rotors having first flat surfaces,
a pair of twisting vibration members vibrating in a twisting manner and a pair of piezoelectric vibration members acting to vibrate said twisting vibration members, said twisting vibration member and said piezoelectric vibration members having second flat surfaces adapted to abut onto the first flat surfaces so that the rotors can be driven by surface contact between the first flat surfaces and the second flat surfaces, each one of said pairs of rotors, piezoelectric vibration members and twisting vibration members being disposed on both sides of a stationary supporting member.

6. The piezoelectric motor according to claim 5, wherein each of the twisting vibration members comprises a plurality of vanes slantingly extending toward the supporting member in the same direction whereby any one of the pairs of piezoelectric vibration members and twisting vibration members is alternatively driven.

7. A piezoelectric motor comprising movable means having a first flat surface, vibration means formed by the combination of at least one bendable, twisting vibration member and at least one piezoelectric element acting to longitudinally vibrate through expansion and compression, said twisting vibration member having a plurality of vanes slantingly extending toward a supporting member so that said twisting vibration member is vibrated in a bending and twisting manner with the same frequency as the frequency of the vibration of said piezoelectric element, said vibration means having a second flat surface which vibrates spirally as the resultant motion between the twisting vibration of the twisting vibration member and expansion-compression vibration of said piezoelectric element and which surface is adapted to abut with the first flat surface so that the movable means can be driven by the spiral mode vibration of the second flat surface due to face-to-face contact between the first flat surface and the second flat surface, said twisting vibration member being formed by a series of buckling spring members.

* * * * *